United States Patent [19]

Padget

[11] 4,122,249

[45] Oct. 24, 1978

[54] SOLVENT REMOVAL FROM CHLORINATED POLYMERS

[75] Inventor: John Christopher Padget, Runcorn, England

[73] Assignee: Imperial Chemical Industries Limited, London, England

[21] Appl. No.: 752,919

[22] Filed: Dec. 21, 1976

[30] Foreign Application Priority Data

Jan. 30, 1976 [GB] United Kingdom ............... 3790/76

[51] Int. Cl.$^2$ ........................... C08F 8/20; C08F 8/22; C08C 3/02; C08C 11/12
[52] U.S. Cl. .............................. 528/486; 260/654 S; 260/655; 260/816 R; 526/43; 528/491; 528/492; 528/495
[58] Field of Search ............... 528/486, 491, 492, 495; 260/816, 654 S, 655

[56] References Cited

U.S. PATENT DOCUMENTS 2,943,988  7/1960  Canterino ............................. 204/163

FOREIGN PATENT DOCUMENTS

| 1,229,343 | 4/1971 | United Kingdom. |
| 986,995 | 3/1965 | United Kingdom. |
| 1,442,876 | 7/1976 | United Kingdom. |
| 977,765 | 12/1964 | United Kingdom ...................... 528/491 |
| 1,082,478 | 9/1967 | United Kingdom ............. 528/486 UX |
| 1,288,057 | 9/1972 | United Kingdom ............. 260/654 UX |

*Primary Examiner*—Stanford M. Levin
*Attorney, Agent, or Firm*—Cushman, Darby & Cushman

[57] ABSTRACT

The proportion of residual solvent in a solid chlorinated polymer prepared by chlorination in a chlorine-resistant solvent and subsequent treatment with steam or hot water is reduced by carrying out the said treatment in the presence of a polymer lubricant selected from the group consisting of aliphatic carboxylic acids and alcohols having at least 8 carbon atoms and esters and amides of said carboxylic acids, the said polymer lubricant being compatible with the chlorinated polymer in the proportions employed.

9 Claims, No Drawings

SOLVENT REMOVAL FROM CHLORINATED POLYMERS

This invention relates to the production of chlorinated polymers.

The term "polymer" as used herein includes copolymers.

A process commonly employed for the chlorination of aliphatic polymers (for example natural rubber, polybutadiene, polyisoprene, polyethylene, polypropylene and ethylene/propylene copolymers) comprises introducing gaseous chlorine into a solution of the polymer in a chlorine-resistant organic solvent at an elevated temperature (for example at a temperature in the range 60° C to 120° C).

The chlorine-resistant solvents commonly employed in this process are chlorinated hydrocarbons, and include not only those solvents which are inert towards chlorine but also others which may react to some degree with chlorine under the conditions employed but, in so reacting, are converted to chlorinated solvents which are substantially inert towards chlorine. Examples include carbon tetrachloride, chloroform, methylene chloride, trichloroethylene, tetrachloroethane and mixtures thereof.

The chlorinated polymer produced may conveniently be isolated in solid form by treatment of the reaction mixture with steam or hot water, thereby distilling off most of the organic solvent employed in the chlorinated reaction.

The solid chlorinated polymers thus obtained may be dried by conventional means but, even after the drying stage, often retain an appreciable proportion of the organic solvent in the product (for example up to 10 parts by weight or organic solvent per hundred parts by weight of the chlorinated polymer). The residual organic solvent is difficult to remove by further drying or direct distillation but vapours of the organic solvent retained in the product may in some circumstances be evolved during subsequent use of the chlorinated polymer, for example during the formulation or use of a paint containing the chlorinated polymer. Such evolution of the organic solvent is generally undesirable, in view of the toxicity of the solvents commonly employed in the chlorination process.

Chlorinated polymer compositions usually have incorporated therein a plasticizer, for example a chlorinated paraffin, a chlorinated diphenyl, a phthalate ester or a phosphate ester. The plasticizers used in chlorinated polymer compositions are of the same chemical types as those employed in the formulation of poly(vinyl) chloride) compositions.

An important difference between chlorinated polymer compositions and poly(vinyl chloride) compositions is that poly(vinyl) chloride) compositions usually contain not only plasticizers but also additives known as "lubricants", the function of which is to prevent excessive sticking during processing, for example during extrusion.

The proportion of lubricant in a poly(vinyl chloride) composition is usually very much lower than the proportion of plasticizer; the proportion of lubricant (by weight) is usually from 0.5 to 1 part per hundred parts of polymer whereas the proportion of plasticizer may be 50 parts or more per hundred parts of polymer. Chlorinated polymer compositions, on the other hand, find application in surface coatings and there is no need for the incorporation of processing aids such as lubricants.

We have now found, however, that in the preparation of a chlorinated polymer the addition of a lubricant prior to separation of the chlorinated polymer by treatment with steam or hot water reduces the proportion of organic solvent in the final product.

Thus according to the present invention there is provided a process for the preparation of a chlorinated polymer product wherein a solution produced by chlorination of an aliphatic polymer in a chlorine-resistant solvent is treated with steam or hot water, thereby separating a chlorinated polymer product in solid form, the treatment with steam or hot water being carried out in the presence of a minor proportion by weight (based on the weight of chlorinated polymer) of a polymer lubricant which is compatible with the chlorinated polymer product in the proportions employed.

The process of the present invention leads to a solid chlorinated polymer product having a lower proportion of residual solvent than the corresponding product which would be obtained in the absence of the added polymer lubricant.

The solution treated will usually be the direct product of the chlorination of one or more aliphatic polymers in the chlorine-resistant solvent. Thus according to another aspect of the present invention there is provided a process for the preparation of a chlorinated polymer product comprising the steps of
 (i) chlorination of one or more aliphatic polymers in a chlorine-resistant solvent at elevated temperature and
 (ii) treatment of the solution thus obtained with steam or hot water, thereby separating a chlorinated polymer product in solid form, the said treatment being carried out in the presence of a minor proportion by weight (based on the weight of chlorinated polymer) of a polymer lubricant which is compatible with the chlorinated polymer in the proportions employed.

The polymer lubricants may be added prior to or during (most conveniently prior to) the treatment with steam or hot water.

The polymers which may be used as starting materials in the chlorination process include those aliphatic hydrocarbon polymers mentioned thereinbefore in relation to the known process, for example natural rubber, polybutadiene, polyisoprene, polyethylene, polypropylene, ethylene-propylene copolymers, and mixtures thereof.

Other polymers which may be used as starting materials in the chlorination process include (poly(halohydrocarbon)s, for example poly(chloroprene) and poly(vinyl chloride) and partially chlorinated aliphatic polymers.

The term "aliphatic polymer" includes polymers containing units derived from one or more aliphatic monomers and also containing units derived from an aromatic compound, for example (i) the polymers or copolymers of butadiene and isoprene containing toluene in condensed form as described in the specification of United Kingdom Pat. No. 1,082,478 and (ii) telomers derived from a conjugated diene or vinylidene-substituted aromatic compound as taxogen and from an aromatic compound (for example toluene) as telogen, as described in the specification of United Kingdom Pat. No. 1,288,057.

Suitable chlorine-resistant organic solvents, suitable conditions and techniques for the chlorination, and suitable techniques for separating the solid chlorinated polymers by precipitation with steam or hot water may be any of those known in the art.

The polymer lubricant is preferably an aliphatic carboxylic acid or alcohol having at least 8 carbon atoms, or a salt, ester or amide derivative thereof.

When a carboxylic acid as such is employed this preferably contains at least 12 carbon atoms, for example stearic acid, oleic acid, and lauric acid.

Similarly, when an alcohol is employed as such this preferably contains at least 12 carbon atoms, for example stearyl alcohol and cetyl alcohol.

Suitable esters include alkyl ester (for example ethyl palmitate and isodecyl stearate) and esters of polyhydric alcohols (for example glyceryl mono-ricinoleate and propylene glycol mono-ricinoleate).

Suitable amides include oleamides and stearamides (for example ethylene bis-stearamide).

The proportion of the lubricant added is preferably at least 0.5 part (for example from 1 to 10 parts) by weight per hundred parts by weight of the chlorinated polymer. Higher proportions may, however, be used if desired (for example up to 20 parts per hundred parts of the chlorinated polymer), the upper limit being set in practice by such factors as the compatibility of the lubricant with the other chlorinated polymer and the proportion of lubricant which is acceptable for the particular formulation or commercial application in which the chlorinated polymer product is to be used.

The invention is illustrated by the following Examples in which all parts and percentages are by weight unless otherwise stated. In each of the Examples the lubricant was compatible with the chlorinated polymer in the proportions employed.

EXAMPLE 1

A solution was prepared of 89.5 grams of degraded cis 1,4-polyisoprene in 1000 grams of carbon tetrachloride. Gaseous chlorine was passed into this solution at 68° C until the chlorine content of the polymer was 66% by weight. Excess chlorine was removed from the solution by purging with nitrogen.

A portion of this solution containing 100 grams of chlorinated polyisoprene in 380 grams of carbon tetrachlorine was taken and 10 grams of ethyl palmitate was added, followed by stirring at 68° C for 1 hour to effect dissolution of the ethyl palmitate.

The chlorinated polyisoprene was then precipitated by injection of the solution into hot water (95° C), and the precipitated polymer was dried at 70° C for 48 hours in an oven providing a through flow of air. The carbon tetrachloride content of the dried chlorinated polyisoprene was less than 0.1% by weight.

The procedure was repeated except that the weight of ethyl palmitate added was 5 grams instead of 10 grams. The carbon tetrachloride content of the dried chlorinated polyisoprene was 0.6% by weight.

For purposes of comparison the same procedure was followed except that there was no addition of the ethyl palmitate. The carbon tetrachloride content of the dried chlorinated polyisoprene was 6.9% by weight.

EXAMPLE 2

The procedure of Example 1 was repeated except that the lubricant added to the solution of chlorinated polyisoprene was propylene glycol mono-riconoleate (10 grams). The carbon tetrachloride content of the dried chlorinated polyisoprene was less than 0.1% by weight.

The procedure was repeated using 5 grams of propylene glycol mono-riconoleate; the carbon tetrachloride content of the dried chlorinated polymer was 0.6% by weight.

EXAMPLE 3

The procedure of Example 1 was repeated except that the lubricant added to the solution was lauryl alcohol (5 grams). The carbon tetrachloride content of the dried chlorinated polyisoprene was 2.1% by weight.

EXAMPLE 4

The procedure of Example 1 was repeated except that the lubricant added to the solution was glyceryl monoricinoleate (10 grams). The carbon tetrachloride content of the dried chlorinated polyisoprene was 0.3% by weight.

EXAMPLE 5

The procedure of Example 1 was repeated except that the lubricant added to the solution was isodecyl stearate (10 grams). The carbon tetrachloride content of the dried chlorinated polyisoprene was less than 0.1% by weight.

EXAMPLES 6 TO 12

The procedure of Example 1 was repeated except that the lubricant added to the solution was the lubricant specified in the Table 1 and that the precipitated polymer was dried at 85° C for 24 hours. In each case the amount of lubricant added was 5 grams.

TABLE 1

| Example | lubricant added | carbon tetrachloride content of the dried chlorinated polyisoprene. % by weight |
|---|---|---|
| 6 | n-tetradecanol | 0.85 |
| 7 | n-dodecanol | 1.1 |
| 8 | n-decanol | 2.0 |
| 9 | lauric acid | 0.8 |
| 10 | Tridecanol (mixture of isomeric branched chain primary $C_{13}$ alchohols) | 1.75 |
| 11 | "Synprol" (67% $C_{13}$ and 33% $C_{15}$ primary alchohols | 0.6 |
| 12 | "Repanol" (mixture of $C_{13}$ and $C_{15}$ primary alchohols) | 0.8 |

("Synprol" and "Repranol" are trade marks)

By way of comparison the procedure of Examples 7 to 13 was repeated except that no lubricant was added. The carbon tetrachloride content of the dried chlorinated polyisoprene was 7.05% by weight.

What is claimed is:

1. In a process for the preparation of a chlorinated polymer product wherein a solution obtained by chlorination of an aliphatic polymer in a chlorine-resistant solvent is treated with steam or hot water, thereby separating a chlorinated polymer product in solid form, the improvement which comprises carrying out the treatment with steam or hot water in the presence of a minor proportion of at least 0.5 part by weight per 100 parts by weight of the chlorinated polymer of a polymer lubricant from the group consisting of aliphatic monocarboxylic acids and alcohols having at least 8 carbon atoms and esters and amides of the said monocarboxylic acids, the said polymer lubricant being compatible with the chlorinated polymer in the proportions employed.

2. A process according to claim 1 wherein the proportion of the added polymer lubricant is from 1 to 10 parts by weight per hundred total parts by weight of the chlorinated polymer.

3. A process according to claim 1 wherein the solution treated comprises one or more chlorinated polymers prepared by chlorination of an aliphatic hydrocarbon polymer.

4. A process according to claim 3 wherein the aliphatic hydrocarbon polymer is natural rubber, polybutadiene, polyisoprene, polypropylene, polyethylene or an ethylene/propylene copolymer.

5. A process according to claim 1 wherein the polymer lubricant is an aliphatic monocarboxylic acid containing at least 12 carbon atoms.

6. A process according to claim 1 wherein the polymer lubricant is an aliphatic alcohol containing at least 12 carbon atoms.

7. A process according to claim 1 wherein the chlorine-resistant solvent is a chlorinated hydrocarbon.

8. A process according to cliam 2 wherein the chlorinated hydrocarbon is carbon tetrachloride.

9. A process according to claim 1 wherein the polymer lubricant is an ester of a monocarboxylic acid having at least 12 carbon atoms.

* * * * *